United States Patent [19]

Merry et al.

[11] Patent Number: 5,151,253
[45] Date of Patent: Sep. 29, 1992

[54] CATALYTIC CONVERTER HAVING A MONOLITH MOUNTING OF WHICH IS COMPRISED OF PARTIALLY DEHYDRATED VERMICULITE FLAKES

[75] Inventors: Richard P. Merry, White Bear Lake, Minn.; Roger I. Langer, Hudson, Wis.

[73] Assignee: Minnesota Mining and Manufacturing Company, St. Paul, Minn.

[21] Appl. No.: 687,296

[22] Filed: Apr. 18, 1991

[51] Int. Cl.$^5$ .............................. B01D 53/36
[52] U.S. Cl. .................... 422/179; 422/221; 422/180; 55/502; 55/509; 55/513; 55/DIG. 30; 60/299; 60/322; 252/606; 252/378 R; 428/324; 106/626; 106/DIG. 3
[58] Field of Search ............... 422/179, 180, 221, 222, 422/502, 509; 55/DIG. 30, 513; 60/299, 322; 252/606, 378 R; 428/324; 106/626, DIG. 3

[56] References Cited

U.S. PATENT DOCUMENTS

| | | | |
|---|---|---|---|
| 3,916,057 | 10/1975 | Hatch et al. | 422/180 |
| 4,305,992 | 12/1981 | Langer et al. | 428/324 |
| 4,863,700 | 9/1989 | Ten Eyck | 422/179 |

Primary Examiner—Lynn M. Kummert
Attorney, Agent, or Firm—Gary L. Griswold; Walter N. Kirn; Jeffrey L. Wendt

[57] ABSTRACT

A monolith can be mounted in a catalytic converter by a material containing intumescent vermiculite flakes that have a uniform content of chemically bound water from about 1.0 to 3.2% by weight and a uniform bulk density from about 0.2 to 0.9 g/cm$^3$. Such a mounting affords good support to the monolith at warm-up temperatures, exerts adequate holding forces at operating temperatures without danger of cracking the monolith, and does not incur gradual reduction in holding forces at operating temperatures.

12 Claims, 2 Drawing Sheets

CATALYTIC CONVERTER HAVING A MONOLITH MOUNTING OF WHICH IS COMPRISED OF PARTIALLY DEHYDRATED VERMICULITE FLAKES

BACKGROUND OF THE INVENTION

1. Field of the Invention

The invention relates to a catalytic converter that has a casing in which a monolithic catalytic element is mounted by an intumescent vermiculite.

2. Description of the Related Art

Catalytic converters generally have a metallic casing encasing a monolithic catalytic element (herein referred to as a "monolith"). Because of the high temperatures encountered in the catalytic processes, the monolith usually is ceramic. The monolith typically is mounted in the casing by a material containing flakes of intumescent vermiculite ore which expand when heated to compensate for the greater thermal expansion of the metal of the casing as compared to the ceramic of the monolith.

Mountings containing flakes of intumescent vermiculite ore tend to exert high forces at temperatures at which a catalytic converter operates, which forces can be so high as to distort the metallic casing. Because a casing is more resistant to distortion when of circular cross section, some manufacturers avoid casings of elliptical cross section even though they would be helpful in the design of an automotive vehicle.

An intumescent mounting typically is in the form of a flexible mat which is wrapped around the monolith. The mat preferably incorporates inorganic fibrous material plus inorganic binder and/or organic binder which improve the integrity of the mat and thus make it easier to be wound onto a monolith and to stay in place.

Intumescent vermiculite mats are disclosed in co-assigned U.S. Pat. Nos. 3,916,057 (Hatch et al.) and U.K. Pat. 1,513,808 (issued Jun. 7, 1978). However, as is explained in co-assigned U.S. Pat. No. 4,305,992 (Langer et al.), the intumescent vermiculite of each has a region of negative expansion (contraction) between about 100° and 400° C. that can cause the monolith of a catalytic converter to become loose from the casing during the warm-up period of the converter. To guard against such loosening, the initial expansion temperature of the intumescent vermiculite should be as low as possible, and the intumescent vermiculite should not experience any negative expansion.

The Langer patent subjects flakes of vermiculite ore to an ammonium cationic exchange, both to reduce the degree of negative expansion and to reduce the temperature at which the intumescent mats begin to expand. U.S. Pat. No. 4,746,570 (Suzaki et al.) likewise subjects flakes of vermiculite ore to a cationic exchange plus a subsequent amine treatment in order to improve heat resistance and resiliency after repeated flexing at the high temperatures to which catalytic converters are subjected in use.

As explained in co-assigned U.S. Pat. No. 4,617,176 (Merry), pressure exerted against the monolith by intumescent vermiculite ore can be so high that, when combined with other factors, the monolith can experience "ring-off" cracks. In severe cases, the monolith is completely severed into two pieces. The Merry patent solves the ring-off problem by employing a flexible intumescent planar mat or sheet that is corrugated, i.e., it has a generally sinusoidal wave pattern along both its lengthwise edges, thus reducing forces exerted against the monolith. However, the corrugations of the intumescent sheet leave gaps that tend to allow heat to escape to the casing.

The Merry patent treats monolithic diesel particulate filters in the same manner as monolithic catalytic converters, and the term "catalytic converter" is meant to encompass monolithic diesel particulate filters. Like ordinary catalytic converters, many diesel monolithic particulate filters have a ceramic monolith mounted in a metallic casing, and the mounting can be a sheet of intumescent material.

Co-assigned U.S. Pat. No. 4,385,135 (Langer et al.) employs intumescent vermiculite for mounting a monolithic catalytic element and reduces "ring-off" cracking by substituting low density fillers in the vermiculite. Unfortunately, doing so has not provided the long-term durability desired in catalytic converters.

In addition to the above-discussed problems, flakes of intumescent vermiculite ore experience greater expansion when first heated to operating temperatures than in subsequent heating cycles. This thermal degradation results in gradually reduced holding forces at operating temperatures and may also result in gradual erosion of the vermiculite by exhaust gases.

The mounting material employed in many catalytic converters is a wire mesh that undergoes minimal expansion at increased temperatures, but a wire mesh affords less heat insulation than does an intumescent mat or sheet, so that it may be necessary to provide supplemental insulation at added cost. Furthermore, a wire mesh would allow exhaust gases to flow laterally between the casing and the monolith unless blocked in some way at additional cost. See, for example, U.S. Pat. No. 4,269,809 (Bailey et al.).

SUMMARY OF THE INVENTION

The invention provides a catalytic converter, the monolithic catalytic element of which is mounted in the casing by a layer of intumescent material that provides all the advantages of prior intumescent mounting materials, plus additional advantages including elimination of the ring-off problem and no significant reduction in expansion in the second cycle of thermal expansion as compared to the first thermal expansion. These improvements are obtained when the mounting layer comprises intumescent vermiculite flakes having a) from about 1.0 to 3.2% by weight of "chemically bound water," and b) a uniform bulk density from about 0.2 to 0.9 g/cm$^3$.

To determine the percentage of "chemically bound water" of vermiculite flakes, they are heated to 100° C. to drive off free water and then to 900° C. while measuring the amount of water that evolves between 100° and 900° C. This measurement indicates the amount of "chemically bound water." After being heated to 900° C., the vermiculite flakes may contain some water, but this has no practical significance because the mounting material of a catalytic converter would rarely be exposed in use to temperatures above 900° C.

BRIEF DESCRIPTION OF THE DRAWINGS

The invention may be more easily understood in reference to the drawings in which.

DETAILED DESCRIPTION OF THE INVENTION

Figure 1:
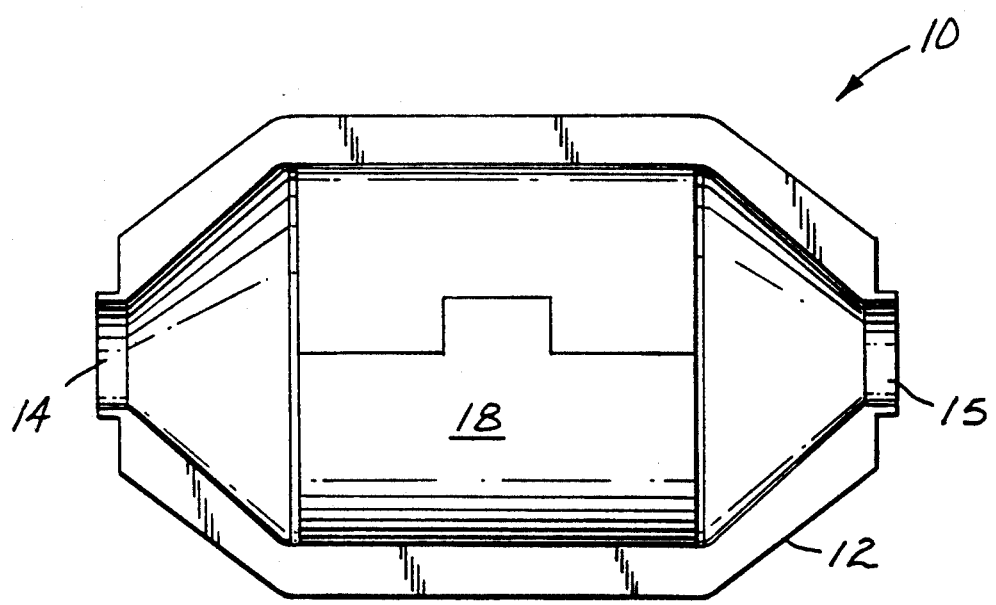
FIG. 1 is a plan view of a catalytic converter of the invention, with half of its casing removed.

The intumescent vermiculite flakes preferably are produced by partially dehydrating vermiculite ore at a temperature between 350° and 800° C., more preferably between 450° and 650° C. The partial dehydration is complete within three hours. The preferred percent of chemically bound water liberated in the process of heating to 900° C. is from about 1.0 to 3.2% by weight of the ore. The most preferred is from about 1.5 to 3.2% by weight of the ore. Ore is herein defined as unexpanded vermiculite flakes. The desired water content and bulk density can also be achieved by heating for shorter times at somewhat higher temperatures up to about 1000° C., but this makes it more difficult to attain the precisely desired water content and bulk density. Partial dehydration can alternatively be accomplished by chemically treating the vermiculite ore, e.g., with acids. However, this method is not preferred due to the cost of the acid and waste disposal problems.

Preferably, when heating to partially dehydrate the vermiculite ore, its normal volume expansion is restricted in order to produce flakes having a lower initial expansion temperature and also a higher bulk density.

Intumescent vermiculite flakes that can be used in mounting material of the novel catalytic converters of the present invention, as compared to known intumescent vermiculite flakes, 1) have a substantially lower initial expansion temperature and undergo substantially reduced or no negative expansion at the moderately elevated warm-up temperatures of a catalytic converter (thus better supporting a monolith at warm-up temperatures), 2) when used in a catalytic converter mounting, exert adequate, yet lower, holding forces at high operating temperatures (thus affording good support for a monolith without danger of cracking; furthermore, this should make it feasible for the first time to employ intumescent vermiculite for mounting a monolith in a catalytic converter of elliptical cross section without danger of distorting the casing), and 3) experience substantially no thermal degradation when repeatedly heated to about 750° C. and cooled to room temperature, in contrast to significant thermal degradation experienced by known intumescent vermiculite flakes.

Preferably, the bulk density of the intumescent vermiculite flakes of the present invention is from about 0.2 to 0.9 g/cm$^3$ because, below this preferred range, the holding forces in a catalytic converter might be lower than required in some uses. A most preferred range is from about 0.5 to 0.9 g/cm$^3$. At a bulk density substantially above 0.9 g/cm$^3$, the holding forces might produce ring-off cracks.

The intumescent vermiculite flakes have average particle sizes from 0.05 to 5 mm. Flakes of substantially smaller average sizes might afford inferior holding forces in a catalytic converter. Flakes of substantially larger average particle sizes would be more difficult to cut cleanly into useful shapes. Preferably, the average particle size of the novel flakes is about from 0.1 to 1.0 mm.

To be used for mounting a monolith in a catalytic converter, the intumescent vermiculite flakes can be converted into a flexible, coherent mat by standard papermaking techniques, preferably by employing from 10 to 70% by weight of the vermiculite flakes, from 25 to 85% by weight of inorganic fibrous material, and from 2 to 20% by weight of organic and/or inorganic binder. Useful inorganic fibrous materials include alumina-silicate fibers (available under the tradenames "Cerafiber," "Kaowool," and "Fiberfrax," commercially available from Manville Corporation, Thermal Ceramics, and Carborundum Company, respectively), soft glass fibers (available under the tradename "E-glass," commercially available from Manville Corporation), mineral wool, and refractory filaments such as zirconia-silica fibers and crystalline alumina whiskers. Suitable organic binders include rubber latexes such as natural rubber, styrene-butadiene, butadiene-acrylonitrile, acrylates, and methacrylates. Suitable inorganic binders include bentonite and colloidal silica. Small amounts of surfactants, foaming agents, and flocculating agents may also be used.

Instead of being used in a mat for mounting a monolith in a catalytic converter, the intumescent vermiculite flakes can be converted into a paste by admixture with water and clays, colloids, or thixotropic agents. The paste can be injected into the space between the monolith and the casing, thus assuring complete filling of that space, as well as uniform mount density. However, a mat may be easier to use because of problems of holding and sealing during the injection.

Testing

Bulk Density

Bulk volume measurements are performed by packing vermiculite flakes in a 100-ml graduated cylinder and tapping the cylinder on a hard surface 40-50 times before reading the volume. Bulk densities are calculated using bulk volume measurements.

Thermogravimetric analysis to Determine Bound Water (TGA)

Using a sample of approximately 12 mg, TGA (plotting percent weight loss vs. temperature rise) is performed using a 1090B thermal analyzer and a 951 thermogravimetric analyzer, both from E. I. duPont. Chemically bound water is irreversibly lost in this test.

Thermal Expansion Test

This test uses a Theta Dilatronic II Thermal Analyzer, Model MFE-715. With 0.2 g of vermiculite flakes in a 7.2-mm-diameter quartz crucible in a furnace, an end of a 7.0-mm-diameter quartz rod rests on the vermiculite flakes under a 1350 g dead weight applying a force of 0.345N/mm$^2$. While recording the displacement of the rod as a function of vermiculite temperature using a pen writer, the temperature is increased 20° C. per minute from room temperature to about 750° C., and the furnace is allowed to cool to room temperature. From the heating portion of the first cycle, the "% Expansion" is calculated at various temperatures.

The sample then undergoes a second, identical heating cycle. When the maximum thermal expansion in the second cycle is less than that during the first cycle, this indicates that the vermiculite flakes have been thermally degraded. The degraded vermiculite flakes, when employed in a catalytic converter mounting, would exert gradually reduced holding forces at operating temperatures.

Push-out Force

To determine how securely a mounting holds a monolith in place in a catalytic converter, a mounting mat, cut to fit the monolith, is employed to mount a cylindrical ceramic monolith, 11.84 cm in diameter by 15.24 in length in a metal casing, 12.34 cm by 17.78 cm in length. The peak force required to move the monolith relative to the canister is measured at room temperature, 300° C., 600° C., and again after cooling to room temperature. The applied force is measured on an MTS tensile tester (MTS Systems Corp.).

DESCRIPTION OF THE PREFERRED EMBODIMENTS

In FIG. 1, a catalytic converter 10 includes a metal casing 12, one half of which is shown. The casing has generally a frusto-conical inlet and outlet 14 and 15, respectively. Disposed within the casing 12 is a monolithic catalytic element (or monolith) of a refractory material such as ceramic having internal gas flow channels (not shown). Wrapped around the monolith is a mat 18 containing intumescent vermiculite flakes. The mat 18 mounts the monolith snugly within the casing 12 and seals the space between the monolith and casing 12 to prevent exhaust from bypassing the monolith.

Figure 2:
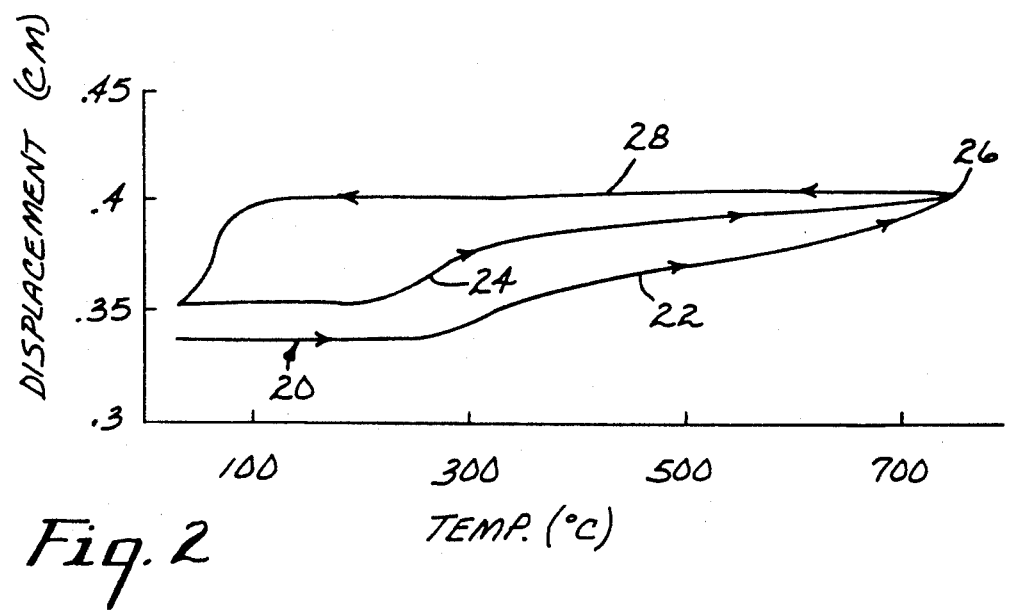
FIG. 2 shows a thermal expansion curve of intumescent vermiculite flakes that can be used as a mounting in a catalytic converter of the invention.
Figure 3:
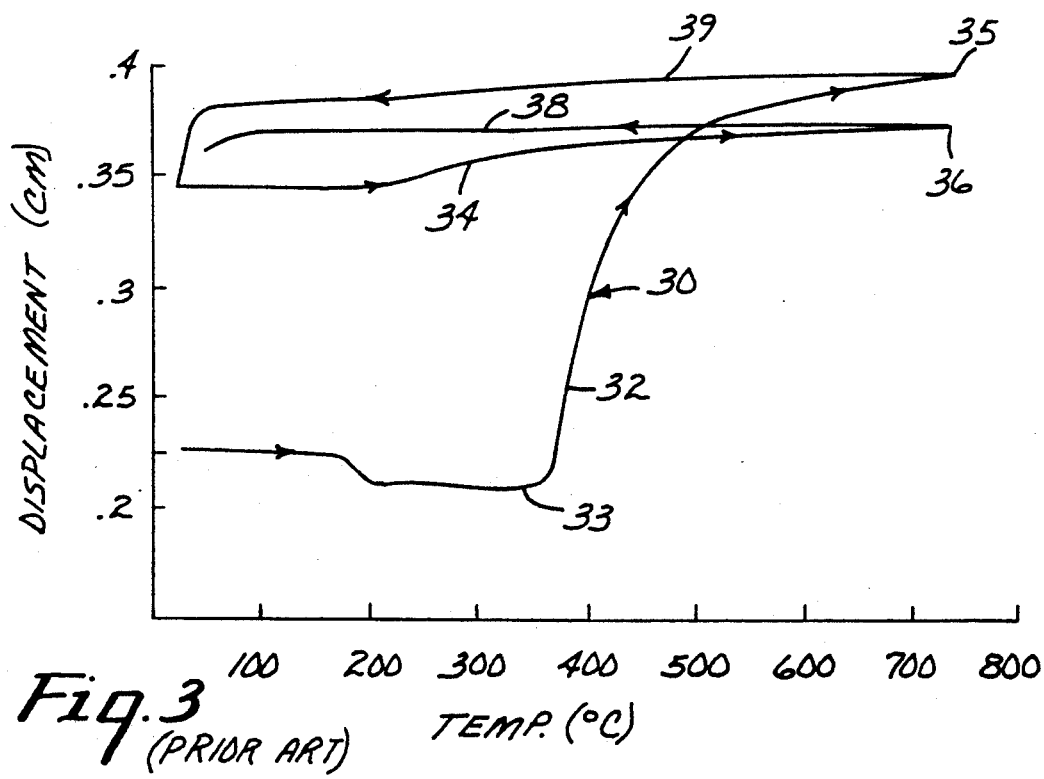
FIG. 3 shows, for purposes of comparison, a thermal expansion curve of prior art vermiculite ore.

Curve 20 of FIG. 2 shows thermal expansion characteristics of intumescent vermiculite flakes of the present invention as described in Example 4 below; and curve 30 of FIG. 3 shows, for purposes of comparison, thermal expansion characteristics of the flakes of vermiculite ore of the prior art described in comparative Example A below. During the initial heat-up portion 32 of curve 30 of FIG. 3, negative expansion begins at about 175° C. and reaches −8% at point 33, i.e., at about 340° C. Upon being heated to 370° C. the expansion returns to zero, and continual heat-up produces a maximum expansion at about 750° C. (point 35).

The negative expansion is contrasted with curve 20 of FIG. 2, which shows no negative expansion. The initial heat-up portion 22 of curve 20 of FIG. 2 shows expansion beginning at about 235° C. In the second heat-up portion 24 of curve 20, the intumescent vermiculite flakes of the present invention reach the same maximum positive expansion at about 750° C. (point 26) as in the first cycle, and the cooling portion 28 of curve 20 during the second cycle retraces that of the first cycle.

In the second heat-up portion 34 of curve 30 of FIG. 3, the vermiculite ore reaches a maximum positive expansion at point 36 which is appreciably reduced from the maximum attained in the first cycle (point 35), thus indicating thermal degradation. The cooling portion 38 of the second cycle of curve 30 lies well below the cooling portion 39 of the first cycle.

Testing various intumescent vermiculite flakes has demonstrated that whenever there is thermal degradation, it is most obvious in the second cycle. Testing of some partially dehydrated intumescent vermiculite flakes of the invention has shown progressively higher maximum thermal expansions at about 750° C. through the first few cycles and no reduction in expansion in any cycle as compared to earlier cycles, even when tested over 50 cycles.

In the following examples, all parts are given by weight.

EXAMPLES 1-8

Partially dehydrating vermiculite ore while restricting expansion

Several 2.4-mm vent holes were drilled through the 9 mm-thick wall and lid of a cylindrical stainless steel canister, having internal dimensions 5.4 cm long×5.7 cm diameter. A centrally placed thermocouple was wired through a vent. Into the cavity of this canister was placed vermiculite ore (VCX-104 from W. R. Grace Co.) in amounts between about 75% to 125% of its natural packing density (about 1.2 g/cm$^3$). The canister was closed and placed in an oven that was preheated to and maintained at a given temperature. The thermocouple reached that temperature after about 2.5 hours, and that temperature was maintained an additional half hour before removing the canister. After allowing it to cool to room temperature, the lid was detached to remove the resulting partially dehydrated intumescent vermiculite flakes.

EXAMPLES 9-14

Partially dehydrating vermiculite ore while allowing free expansion

About 75 g of loose vermiculite ore was held for three hours in a 250-ml porcelain crucible in an oven that had been pre-heated to and was maintained at a given temperature, thus producing partially dehydrated intumescent vermiculite flakes of the invention. A thermocouple had been centrally buried in the sample to record the highest temperature to which it was heated.

Table I reports in sequence for Examples 1-14 the highest temperature to which each was heated ("Exposure Temp."), the "Packing Density" (Examples 1-8 only), and the "Fired Bulk Density" of the partially dehydrated vermiculite flakes. Table I next reports results of the Thermal Expansion Test, including the "% Expansion" at various temperatures and the temperatures at which the sample begins to expand ("Begins") and at which its expansion is zero ("0%").

Table I also reports under "% Expansion" the expansion of the sample in the second cycle of the Thermal Expansion Test at various temperatures. Desirably, the "% Expansion" in the second cycle is equal to or greater than that in the first cycle.

COMPARATIVE EXAMPLES A-B

Table I also reports testing of vermiculites that are representative of the prior art, namely,
A = VCX-104 of W. R. Grace Co.
B = Example 1 of above-cited U.S. Pat. No. 4,305,992.

TABLE I

| Example | Exposure Temp. (°C.) | Packing Density (g/cm) | Fired Bulk Density (g/cm) | % Expansion at °C. | | | | | | | Expansion Temp (°C.) | |
|---|---|---|---|---|---|---|---|---|---|---|---|---|
| | | | | 100° | 200° | 300° | 400° | 500° | 600° | 700° | Begins | @ 0% |
| 1 | 300 | 1.11 | 1.10 | −1.0 | −5.9 | −6.9 | 28.7 | 71.3 | 78.2 | 82.2 | 345 | 375 |
| 2 | 400 | 1.14 | 0.78 | −0.9 | −3.0 | −2.6 | 6.0 | 34.5 | 45.7 | 54.3 | 285 | 345 |
| 3 | 478 | 1.08 | 0.66 | 0 | −0.7 | 2.6 | 8.1 | 14.1 | 19.6 | 27.4 | 235 | 260 |

TABLE I-continued

| Example | Exposure Temp. (°C.) | Packing Density (g/cm) | Fired Bulk Density (g/cm) | % Expansion at °C. 100° | 200° | 300° | 400° | 500° | 600° | 700° | Expansion Temp (°C.) Begins | @ 0% |
|---|---|---|---|---|---|---|---|---|---|---|---|---|
| 4 | 581 | 1.20 | 0.62 | 0 | 0 | 2.2 | 6.7 | 9.6 | 12.2 | 16.3 18.1* | 235 | 235 |
| 5 | 703 | 1.09 | 0.63 | 0 | 0 | 2.0 | 4.3 | 5.8 | 7.1 | 8.6 | 220 | 220 |
| 6 | 789 | 1.21 | 0.67 | 0 | 0 | 1.7 | 3.8 | 5.0 | 6.0 | 7.5 | 215 | 215 |
| 7 | 585 | 0.90 | 0.56 | 0 | 0 | 1.5 | 5.3 | 7.0 | 9.0 | 13.0 | 235 | 235 |
| 8 | 585 | 1.56 | 0.77 | 0 | 0 | 6.0 | 14.5 | 18.8 | 22.5 | 27.8 | 215 | 215 |
| 9 | 340 | — | 1.21 | 0 | −0.5 | −0.5 | 12.7 | 53.1 | 62.0 | 66.2 56.8* | 365 | 370 |
| 10 | 390 | — | .45 | 0 | −0.9 | −0.9 | 0 | 12.9 | 22.4 | 31.9 33.6* | 365 | 400 |
| 11 | 437 | — | .37 | 0 | 0 | 0 | 0.4 | 2.9 | 6.2 | 11.3 13.5* | 350 | 385 |
| 12 | 490 | — | .31 | −0.3 | −0.3 | −0.3 | 0.2 | 1.0 | 3.6 | 5.1 6.3* | 300 | 380 |
| 13 | 590 | — | .25 | 0 | −0.4 | −0.4 | 0 | 0.7 | 0.8 | 1.4 2.1* | 300 | 400 |
| 14 | 690 | — | .25 | 0 | 0 | 0 | 0.3 | 0.6 | 0.6 | 0.6 0.0* | 400 | 400 |
| A | | | | −0.5 | −6.1 | −8.3 | 29.3 | 63.5 | 70.7 | 74.0 64.1* | 340 | 370 |
| B | | | | −0.5 | −2.1 | 25.7 | 50.8 | 63.9 | 71.2 | 76.4 | 265 | 275 |

Table I illustrates, for Examples 1-8, that the exposure temperature for restricted expansion should be above about 450° C. to ensure low negative expansion and lower initial expansion temperature. Examples 4-8 show no negative expansion for exposure temperature above 478°, which is desirable. Examples 9-14, for free expansion, illustrate that the exposure temperature should be about 400° to 600° C. to ensure similar expansion properties. A negative thermal expansion of less than about 1% is preferred for most applications. Controls A and B illustrate expansion properties which are undesirable for mats encasing monolithic catalytic elements.

EXAMPLE 15 and COMPARATIVE EXAMPLE C

Example 15 used a vermiculite ore which was partially dehydrated while restricting expansion as in Examples 1-8 except that the vermiculite ore was "Strong-Lite," Micron Grade (0.1 to 0.6 mm) vermiculite from Strong-Lite Products Corp. The exposure temperature was 600° C., the packing density was 1.06 g/cm³, and the fired bulk density was 0.68 g/cm³. Testing of the resultant intumescent flakes of the invention is reported in Table II together with testing of the "Strong-Lite" ore (Comparative Example C). This demonstrates that the invention applies to alternate sources of ore.

TABLE II

| Example | % Expansion at °C. 100° | 200° | 300° | 400° | 500° | 600° | 700° | Expansion Temp (°C.) Begins | @ 0% |
|---|---|---|---|---|---|---|---|---|---|
| 15 | 0 | −3.3 | −4.0 | −3.7 | −2.6 | −0.7 | 4.4 7.4* | 350 | 515 |
| C | 0 | −0.8 | −6.3 | −6.7 | −3.6 | 18.8 | 26.8 18.8* | 475 | 515 |

*Second heating cycle from 25° C. to 700° C.

It is evident that Example 15 had less expansion at low temperatures and did not expand as much at high temperatures as comparative Example C, which was not exposed to 600° C. to reduce the chemically bound water.

Table III reports testing for thermogravimetric analysis (TGA) of the partially dehydrated vermiculite flakes of each of Examples 1-6, 9-14, and Comparative Example A.

TABLE III

| Example | Thermogravimetric Analysis (% weight loss @ °C.) 100° | 200° | 300° | 400° | 500° | 600° | 700° | 800° | 900° |
|---|---|---|---|---|---|---|---|---|---|
| 1 | 3.2 | 3.8 | 3.9 | 4.0 | 4.1 | 4.2 | 4.7 | 5.4 | 7.0 |
| 2 | 0.8 | 1.0 | 1.2 | 1.3 | 1.3 | 1.5 | 2.0 | 2.6 | 4.0 |
| 3 | 0.3 | 0.3 | 0.3 | 0.3 | 0.3 | 0.4 | 0.7 | 1.3 | 2.8 |
| 4 | 0.0 | 0.0 | 0.0 | 0.0 | 0.0 | 0.1 | 0.3 | 0.7 | 2.0 |
| 5 | 0.0 | 0.0 | 0.0 | 0.0 | 0.0 | 0.0 | 0.0 | 0.3 | 1.6 |
| 6 | 0.0 | 0.0 | 0.0 | 0.0 | 0.0 | 0.0 | 0.0 | 0.0 | 1.1 |
| 9 | 1.2 | 1.5 | 1.5 | 1.6 | 1.8 | 2.0 | 2.4 | 3.0 | 4.0 |
| 10 | 0.8 | 1.0 | 1.2 | 1.2 | 1.2 | 1.2 | 1.5 | 2.0 | 3.2 |
| 11 | 0.7 | 0.7 | 0.7 | 0.7 | 0.8 | 1.2 | 1.4 | 1.9 | 2.8 |
| 12 | 0.7 | 0.7 | 0.7 | 0.7 | 0.7 | 0.8 | 1.1 | 1.7 | 3.1 |
| 13 | 0.2 | 0.2 | 0.2 | 0.2 | 0.2 | 0.2 | 0.3 | 0.8 | 2.2 |
| 14 | 0.2 | 0.2 | 0.2 | 0.2 | 0.2 | 0.2 | 0.3 | 0.7 | 1.7 |
| A | 4.8 | 6.0 | 6.5 | 6.8 | 6.9 | 7.2 | 7.7 | 8.2 | 9.6 |

Table III illustrates that flakes that have a zero percentage of weight loss at lower temperatures (such as Examples 4-6) do not exhibit negative expansion. Flakes with lower percentage of weight loss tend to have less negative expansion. Flakes having up to about 3.2% chemically bound water at 900° C. have substantially no negative expansion in the second cycle of the Thermal Expansion Test.

EXAMPLE 16

Catalytic converter of the invention

A mat was made by mixing 56 parts of the partially dehydrated vermiculite flakes of Example 4, 37 parts of alumina-silica fibers, and 7 parts (dry weight) of acrylic latex binder together with a large volume of water, and forming this into a handsheet by a conventional papermaking technique. After being cut to a width of 5.24 cm, the handsheet was wound upon a ceramic monolith 1.84 cm in diameter by 15.24 cm in length and having 62 cells/cm$^2$. The wrapped monolith was stuffed into a metallic canister of stainless steel with an I.D. of 12.34 cm. The mounted handsheet had a mount density of 1.0 g/cm$^3$.

The resulting catalytic converter was connected to an exhaust gas simulator (made by RPS Engineering). This was run at an inlet gas temperature of 954° C. and a flow rate of 39.1 m$^3$/hr at standard temperature and pressure. After ten minutes, the propane was shut off, and room air was introduced at 122.3 m$^3$/hr at standard temperature and pressure until the canister temperature had dropped to about 38° C. Upon disassembly, no cracks were found in the monolith.

COMPARATIVE EXAMPLE D

To provide a catalytic converter that is representative of the prior art, a ceramic monolith was wrapped, as in Example 16, except using as the mounting a commercial mat available under the tradename "Interam," commercially available from Minnesota Mining and Manufacturing Company, employing intumescent vermiculite ore (again at a mount density of 1.0 g/cm$^3$), which is the mat that is currently being used for mounting monoliths in many catalytic converters. After being tested, as in Example 16, and disassembled, the monolith was found to be in two pieces.

Samples of each of the mats of Example 16 and Comparative Example D were tested for "Push-out Force" at various mount densities and temperatures, with results reported in Table IV.

TABLE IV

| Example | Mount Density (g/cm$^3$) | Push-Out Force (Newtons) | | | |
|---|---|---|---|---|---|
| | | @ Room Temp. | @ 300° C. | @ 600° C. | Return to Room Temp. |
| 16 | 0.71 | 1260 | 2350 | 6140 | 1400 |
| | 0.79 | 2040 | 3520 | 7240 | 2800 |
| | 0.87 | 2860 | 5120 | 10550 | 4080 |
| | 0.95 | 3650 | 4900 | 12880 | 5220 |
| | 1.02 | 4770 | 6470 | 13320 | 5930 |
| | 1.10 | 6060 | 8110 | 18560 | 8410 |
| D | 0.72 | 240 | 90 | 9560 | 1920 |
| | 0.80 | 340 | 140 | 15130 | 2050 |
| | 0.88 | 2010 | 920 | 24000+ | 4810 |
| | 0.96 | 2700 | 1410 | 24000+ | 7420 |
| | 1.04 | 3080 | 1480 | 24000+ | 8540 |

Capacity of tester was 24,000 N

The values of Push-out Force reported in Table IV show that a mounting mat made using the partially dehydrated intumescent vermiculite flakes (versus the comparative mat at a comparable mount density) desirably exerts less force against the monolith at 600° C. (a typical operating temperature for a catalytic converter) and also desirably exerts greater forces both at room temperature and at 300° C.

In view of the foregoing description, it will be apparent that the invention is not limited to the specific details set forth herein for purposes of illustration, and that various other modifications are equivalent for the stated and illustrated functions without departing from the spirit of the invention and the scope thereof as defined in the appended claims.

What is claimed is:

1. A catalytic converter comprising a casing and a monolithic catalytic element which is mounted in the casing by a layer comprising intumescent vermiculite flakes that have
    a) from about 1.0 to 3.2% by weight of chemically bound water, and
    b) a uniform bulk density from about 0.2 to 0.9 g/cm$^3$.

2. A catalytic converter as defined in claim 1 wherein said uniform bulk density of said vermiculite flakes is from about 0.5 to 0.8 g/cm$^3$.

3. A catalytic converter as defined in claim 1 wherein said layer comprises a flexible mat.

4. A catalytic converter as defined in claim 3 wherein said flexible mat comprises said intumescent vermiculite flakes admixed with inorganic fibrous material and binder.

5. A catalytic converter as defined in claim 4 wherein said mat comprises from 10 to 70% by weight of said vermiculite flakes, from 25 to 85% by weight of said inorganic fibrous material, and from 2 to 20% by weight of said binder.

6. A catalytic converter as defined in claim 5 wherein said inorganic fibrous material is selected from the group consisting of alumina-silicate fibers, soft glass fibers, mineral wool, and refractory filaments.

7. A catalytic converter as defined in claim 5 wherein said binder is selected from the group consisting of rubber latices, bentonite and colloidal silica.

8. A catalytic converter as defined in claim 5 wherein said binder is a latex of rubber selected from the group consisting of styrene-butadiene, butadiene- acrylonitrile, acrylates, and methacrylates.

9. A catalytic converter as defined in claim 5 wherein said mat further comprises material selected from the group consisting of surfactants, foaming agents, and flocculating agents.

10. A catalytic converter as defined in claim 1 wherein said layer is provided in the form of a paste.

11. A catalytic converter as defined in claim 1 wherein said monolithic catalytic element comprises ceramic and the casing comprises metal.

12. A catalytic converter as defined in claim 11 wherein said metal casing is elliptical in cross section.

* * * * *

UNITED STATES PATENT AND TRADEMARK OFFICE
CERTIFICATE OF CORRECTION

PATENT NO. : 5,151,253
DATED : September 29, 1992
INVENTOR(S) : Richard P. Merry and Roger L. Langer It is certified that error appears in the above-identified patent and that said Letters Patent is hereby corrected as shown below:

On the title page, item:

| | | |
|---|---|---|
| [75] Inventors: | "Roger I. Langer" should read -- Roger L. Langer -- | |
| Col. 9, line 2 | "5.24" should read -- 15.24 -- | |
| Col. 9, line 4 | "1.84" should read -- 11.84 -- | |

Signed and Sealed this

Ninth Day of November, 1993

Attest:

BRUCE LEHMAN

Attesting Officer     Commissioner of Patents and Trademarks